United States Patent [19]

Kmetz

[11] 4,142,182
[45] Feb. 27, 1979

[54] PROCEDURE FOR ADDRESSING OF VISUAL DISPLAY DEVICES

[75] Inventor: Allan R. Kmetz, Nussbaumen, Switzerland

[73] Assignee: BBC Brown, Boveri & Company, Limited, Baden, Switzerland

[21] Appl. No.: 769,322

[22] Filed: Feb. 16, 1977

[30] Foreign Application Priority Data

Feb. 25, 1976 [CH] Switzerland .......................... 2286/76

[51] Int. Cl.² .............................................. G09F 9/32
[52] U.S. Cl. ..................................... 340/765; 350/333
[58] Field of Search ............... 340/324 R, 324 M, 336

[56] References Cited

U.S. PATENT DOCUMENTS

| | | | |
|---|---|---|---|
| 3,614,771 | 10/1971 | Band et al. | 340/336 |
| 3,760,403 | 9/1973 | Kippenhan | 340/336 |
| 3,781,863 | 12/1973 | Fujita | 340/324 R |
| 3,831,166 | 8/1974 | De Nardo | 340/336 |
| 4,034,368 | 7/1977 | Shimomura | 340/336 |

*Primary Examiner*—Marshall M. Curtis

*Attorney, Agent, or Firm*—Oblon, Fisher, Spivak, McClelland & Maier

[57] ABSTRACT

A procedure for the addressing of visual display devices comprising stylized alphanumeric characters which consist of similarly shaped front and rear display elements, whereby in the case of simultaneous selection of a front and the corresponding rear display elements, an optical activation of these elements results such that by coincident selection of the front and rear display elements of several pairs of elements having a specific geometrical configuration a corresponding alphanumeric character becomes visible, whereby further the number of address leads and drivers is reduced by interconnecting the display elements as a matrix and by time-sharing the address leads through multiplexed operation in such a way that the address leads in one matrix dimension are used to select the front elements of the display and the address lines in the second matrix dimension are used to select the rear elements of the display and the address leads in one of these matrix dimensions extend over more than one character.

2 Claims, 5 Drawing Figures

PROCEDURE FOR ADDRESSING OF VISUAL DISPLAY DEVICES

BACKGROUND OF THE INVENTION

This invention relates to a system for addressing visual display devices.

An alphanumeric display device subdivided into display elements (segments) can be addressed by individual selection of each element. If each character comprises a seven-segment numeral plus decimal point, then a display with nine characters would require 9 × 8 = 72 external connections and 72 address drivers in addition to a common electrode. Individual addressing of so many characters is generally impractical.

The number of connections and drivers can be reduced if one interconnects the display elements as a matrix and applies time-multiplexed addressing. Such an interconnection method is known and is illustrated schematically in FIG. 1. The display elements 1-2 are here considered to be "segments" of a nematic liquid crystal display device, but the invention is not restricted to the application of this principle. The upper part of FIG. 1 is the front electrode layout; the lower part of the figure is the rear electrode layout. The front electrode segments 1 and the rear electrode segments 2 have essentially the same geometrical arrangement so that to each front segment 1 there belongs a homologous rear segment 2. Both segments act together in such a way that simultaneous activation of the corresponding address leads produces a visual display of the segment.

Technologically this principle is realized by evaporation of electrode layers onto glass plates, delineation of segments and interconnections in these layers by photolithography, closely juxtaposing the glass plates and filling the intervening space with a layer of liquid crystal.

The arrangement of the front and thus also the rear segments corresponds to a stylized representation of a character. Each character in FIG. 1 is composed of seven segments; a further display element 3-4 is provided between each character and serves as the decimal point in the display. Activation of all seven segments of a character produces the optical display of the Arabic numeral "8", the number "3" is indicated if only the three horizontal segments and the two vertical segments on the right side are activated, and activation of only the lastmentioned two segments produces the number "1".

In FIG. 1 the front segments 1 in corresponding positions on all digits, as well as all decimal points, are interconnected horizontally by address buses, so that all like elements are addressed in common. For the rear electrodes, all segments 2 of each digit and the right-adjacent decimal point are connected together and addressed by a vertical address bus. These horizontal and vertical buses are equivalent to the rows and columns of a matrix at whose cross-points the segment pairs (front and rear segments) occur.

With an arrangement like FIG. 1 the total number of address leads for a nine-digit display could in principle be reduced from 73 to 8 + 9 = 17. However, the multiplexing capacity of some displays is restricted. For example the optical performance of a twisted nematic display is acceptable when three digits are multiplexed but becomes unsatisfactory if the time-sharing of address signals is extended to nine digits. In this case a nine-digit display could be realized by separately multiplexing each group of three adjacent digits. The total number of address leads using the layout of FIG. 1 would then be 3 × 8 + 3 = 27. The addressing electronics for such a three-digit group is shown schematically in FIG. 2. 5 is a three-digit Binary-coded-decimal (BCD) register, 6 a multiplexer, 7 a BCD-to-seven-segment decoder, 8 a circuit which generates sequential strobe signals which select the digit multiplexed in synchronism with the selected column of the display matrix 9. Thus a single decoder-driver circuit 7 is sequentially switched by the multiplexer 6 among the digits of the input register.

A deficiency in the arrangement of FIG. 1 is the complex photolithography needed to achieve the interconnection pattern. Furthermore, the constrictions in the leads where they have to pass between the display segments raise the electrical resistance of the leads, which leads to diminished display quality. A much simpler arrangement is known which eliminates these problems; it is shown in FIG. 3. Here three front electrode lines and three rear electrode lines are used to address each digit. The addressing circuitry for FIG. 3 is reproduced schematically in FIG. 4. A single standard decoder is no longer sufficient here; a practical alternative is the read-only-memory (ROM) 10 shown. The ROM 10 is shown with internal address decoding 11; 5, 8 and 9 have the same meanings as in FIG. 2. In cases where the display is used with a custom-designed large scale integrated circuit such as a single-chip calculator, this type of addressing is easily implemented. A nine digit display multiplexed in groups of three digits would require 3 × 9 + 3 = 30 address connections. The photolithographically simpler layout of FIG. 3 thus requires three more driven connections than the more complex layout of FIG. 1.

SUMMARY OF THE INVENTION

It is an object of the invention to reduce the number of address connections required while retaining the advantages of a simple layout. This is accomplished in that, whereas the addressing procedure described initially had address leads in one matrix dimension which extended over more than one character, the address leads according to the invention are made also in the second matrix dimension to belong to more than a single character.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 3:
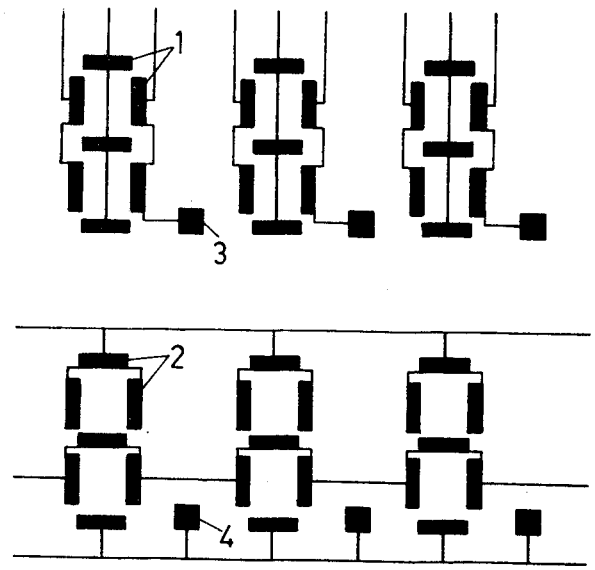
FIG. 3 shows another prior art interconnection scheme for display elements.
Figure 4:
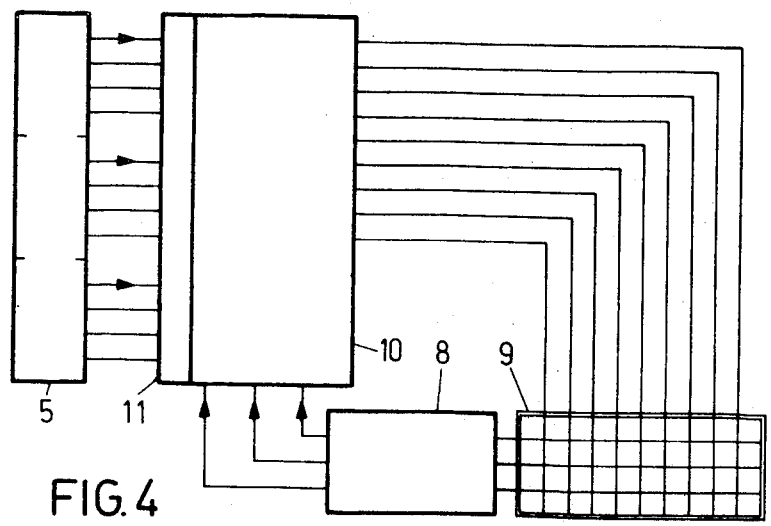
FIG. 4 shows the addressing electronics for the three-digit group of FIG. 3.
Figure 5:
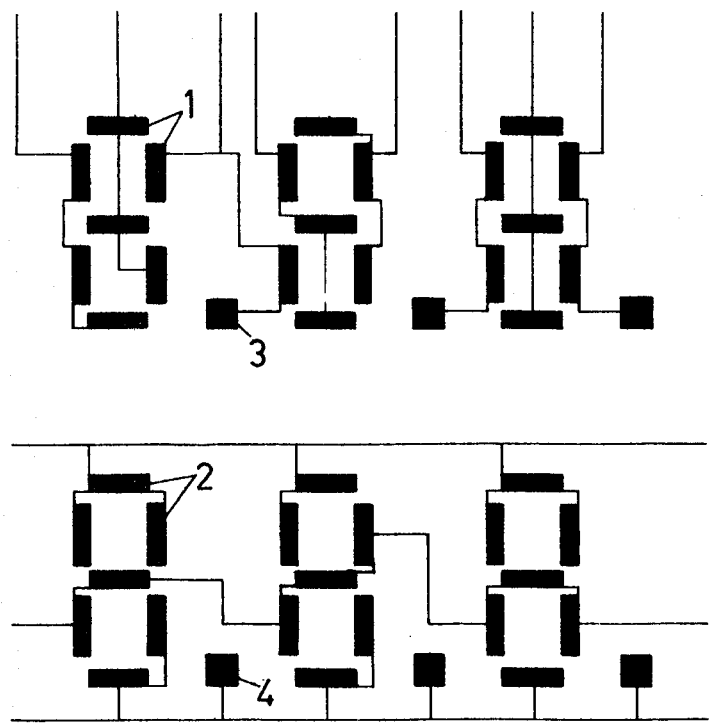
FIG. 5 shows the interconnection scheme for display elements of the present invention.

The invention is next described more closely with the aid of FIG. 5, but first consideration is redirected to FIG. 3. Each character there is addressed as a 3 × 3 matrix, with one matrix position remaining unused (namely in the left-hand column and bottom row where a segment is lacking). Instead of wasting this matrix position, the restriction that in the vertical matrix dimension of FIG. 3 each character should be independently addressed in according to the invention relaxed; the vacant matrix position is filled with an element of a neighboring character. This results in two unused positions of the 3 × 3 matrix for the second character, which positions can in turn be filled with elements from a third character. This scheme is shown in FIG. 5, where three characters are addressed by 8 + 3 = 11 leads. It follows that a nine-digit display multiplexed in groups of three would require only 3 × 8 + 3 = 27 address leads. This is the same lead count as in FIG. 1 but the layout is just as simple and unconstrained as in FIG. 3. The addressing electronics are no more complicated than in FIG. 4, although the ROM would have to be programmed differently to match the arrangement of interconnections.

Figure 1:
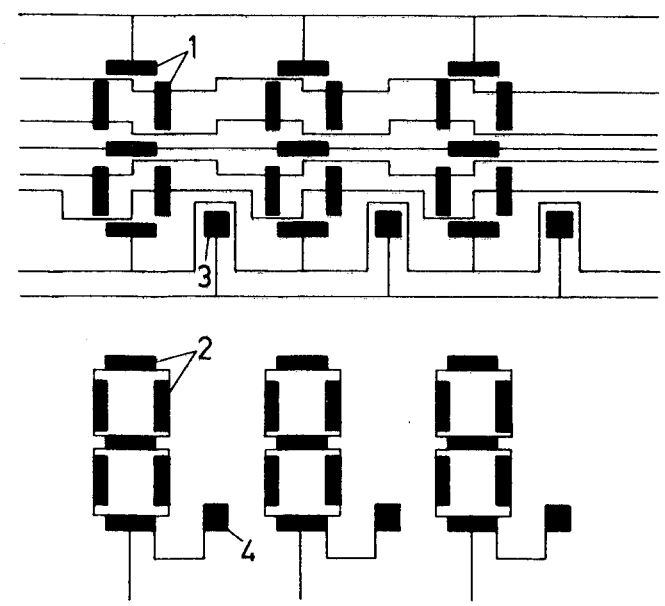
FIG. 1 shows a prior art interconnection scheme for display elements.
Figure 2:
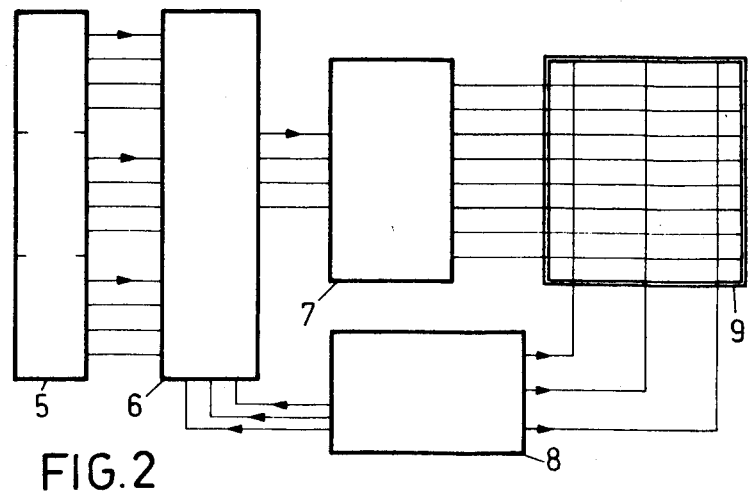
FIG. 2 shows the addressing electronics for the three-digit group of FIG. 1.

With the arrangements shown in FIGS. 1 and 3, the address leads in one matrix dimension extend over more than one character while in the other matrix dimension the addressing of each character is independent of the neighboring characters. In FIG. 1 the row leads interconnect front segments in like positions on all the characters, while each column lead interconnects the rear segments of a single character. Conversely in FIG. 3 the row leads extend over all characters (rear segments) while each column lead interconnects front segments of a single character independent of any neighboring character. In the illustrative example of an arrangement according to the invention shown in FIG. 5, the row leads likewise serve to interconnect rear segments on all the characters, but the column leads are not—or not always—restricted to interconnecting front segments which belong to a single character; this is evident for example in the interconnection of the third and sixth columns of FIG. 5. This has the immediate consequence that one column lead in the second character can be saved.

The basic principle of the proposed method rests on the recognition that the implementation of addressing electronics by large-scale integrated circuits makes it economically practical to relax the conventional requirement that the decoding of all characters in a display be identical.

Whenever the number of elements in a character is not evenly divisible by the number of lines multiplexed, then the total number of driven lines can be reduced by arranging the address lines in both matrix dimensions so they extend over more than a single character. If the number of multiplexed lines is not restricted by the performance characteristics of the display device, then the minimum lead count can be obtained by interconnecting the elements as a square matrix without regard to character integrity. For example an alphanumeric display comprising four 16-segment characters would normally require 4 + 16 = 20 leads if the characters were multiplexed in sequence. The same display could be addressed with only 16 leads if the elements were interconnected as an 8 × 8 matrix.

The proposed method gives a specific technique for reducing the lead count of a liquid crystal calculator display by 10% and discloses a general method for multiplexed addressing of multi-character displays with fewer leads.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the addressing of visual display devices comprising stylized alphanumeric characters which consist of similarly shaped front and rear display elements, whereby in the case of simultaneous selection of a front and the corresponding rear display elements an optical activation of these elements results such that by coincident selection of the front and rear display elements of several pairs of elements having a specific geometrical configuration a corresponding alphanumeric character becomes visible, comprising the steps of:

interconnecting the display elements as a matrix to reduce the number of address leads and drivers;
   extending the address leads in one matrix dimension over more than one character;
   interconnecting display elements which belong to more than one character by address lines in a second matrix dimension;
   time-sharing the address leads through multplexed operation;
   selecting the front elements of the display with the address leads in the one matrix dimension; and
   selecting the rear elements of the display with the address leads in the second matrix dimension.

2. The method according to claim 1 characterized by its application to liquid crystal display devices in which a liquid crystal layer is confined between glass plates which bear evaporated conductive films patterned in the form of electrode segments.

* * * * *